Dec. 11, 1951 W. BORNEMANN ET AL 2,578,283
TAKE-UP MAGAZINE FOR STRIP MATERIAL
Filed Feb. 17, 1949 2 SHEETS—SHEET 1
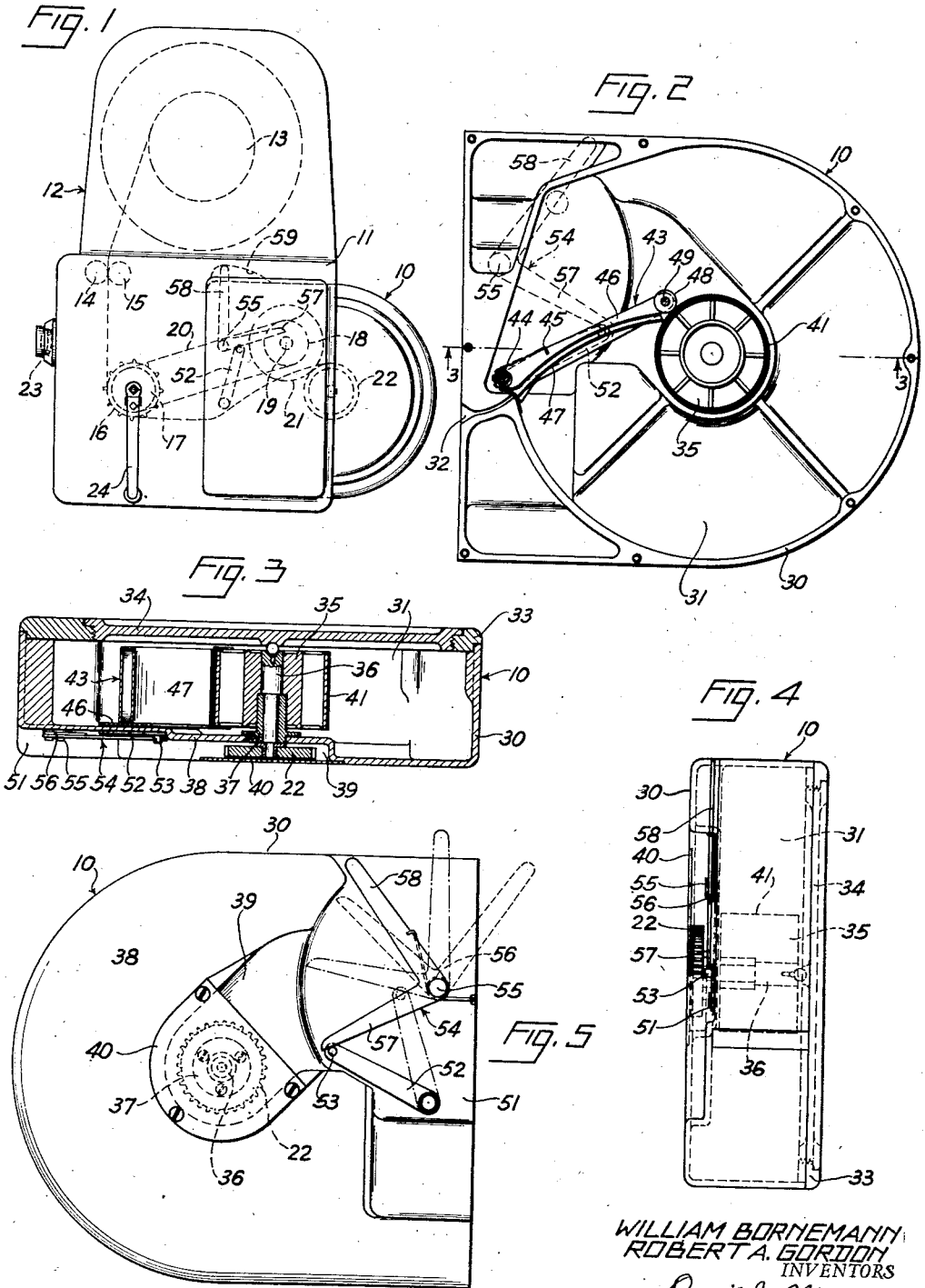
WILLIAM BORNEMANN
ROBERT A. GORDON
INVENTORS

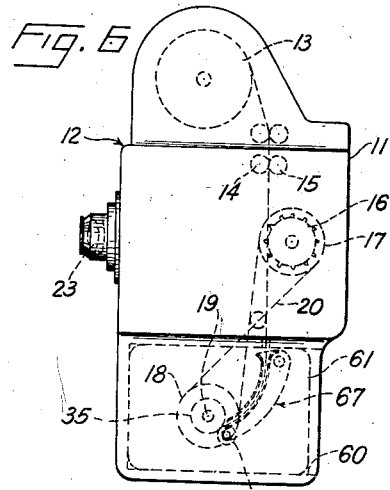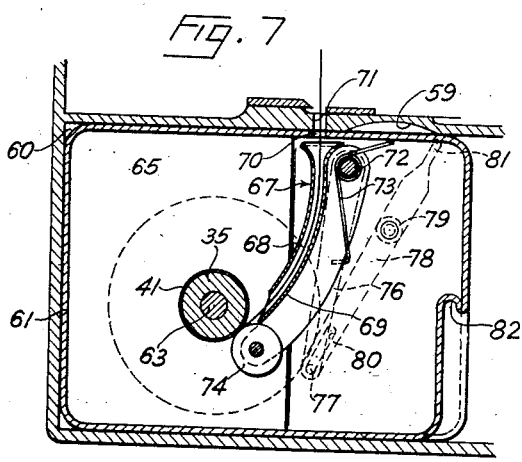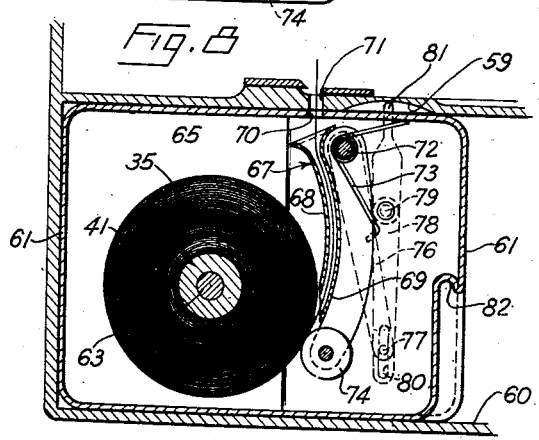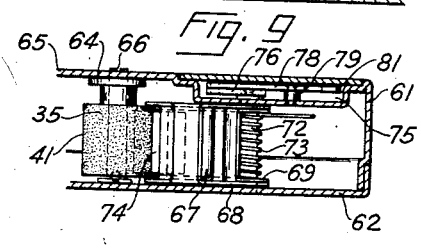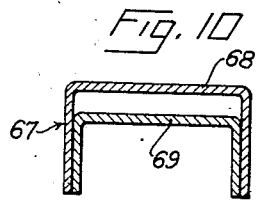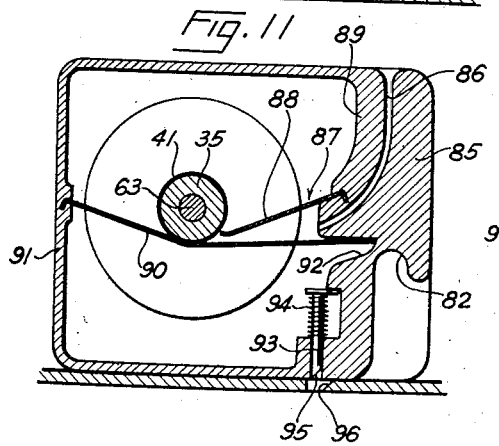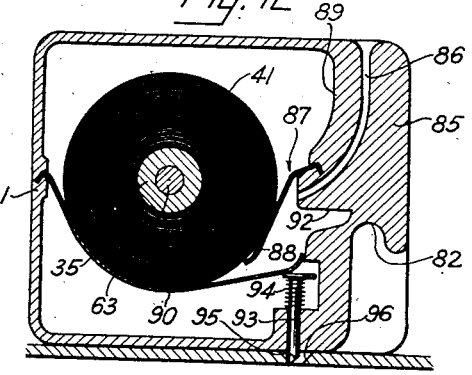

Patented Dec. 11, 1951

2,578,283

UNITED STATES PATENT OFFICE 2,578,283

TAKE-UP MAGAZINE FOR STRIP MATERIAL

William Bornemann and Robert A. Gordon, Rochester, N. Y., assignors to Eastman Kodak Company, Rochester, N. Y., a corporation of New Jersey Application February 17, 1949, Serial No. 76,906

11 Claims. (Cl. 95—34)

This invention relates to magazines and more particularly to magazines of the take-up type as used for strip material or a light sensitive material.

While the use of take-up magazines for strip materials is well known, a satisfactory and sure manner of automatically securing the end of a strip material to a rotating core still presents a problem. In various known types of magazines sharp portruberances extending from the core or bared fingers carried by the core are utilized in fixed or securing the leading end of the strip material to the core. This arrangement usually perforates one or two convolutions of the strip material thereby damaging a length of material that might otherwise be usable. In other types of take-up magazines, the core is eliminated and the inherent curl in the strip material is relied upon to form the convolutions of material, and resilient fingers are sometimes employed to form a first convolution of a minimum diameter. As the convolutions increase in number, they are moved relative to one another because of the resilient fingers and this movement, particularly in light sensitive strip material, causes abrasion marks on the material. Further when an operator is exchanging or loading magazines, which are usually the same in size, contour, etc., it is difficult once two magazines have been laid side by side to ascertain which magazine has just been removed, or whether the magazine being loaded is an empty magazine.

In the present invention, any damage to the leading end of the strip material is eliminated by directing the strip material directly to an adhesive means on the periphery of the take-up core within the magazine and rolling or positively adhering the leading end to the core. The adhesive means may be any one of many commercially available adhesives which do not harden but remain "tacky" for a long period of time, thereby permitting continual re-use of the core and, hence, of the magazine. Also by providing a means actuated to a protruding position with respect to the magazine by the increasing number of film convolutions, the magazine cannot be reinserted into its proper position in a magazine chamber without first removing the strip material from the magazine.

The primary object of the invention, therefore, is to provide a take-up magazine for strip material in which the take-up core is provided with an adhesive means for securing the leading end of the strip material thereto.

Another object of the invention is to provide a take-up magazine for strip material in which the strip material is directed to a take-up core provided with an adhesive periphery and means for applying the leading end of the strip material to the adhesive surface.

Yet another object of the invention is to provide a take-up magazine in which the increasing number of convolutions on the take-up core actuates an element to a protruding position with respect to the magazine to prevent reinsertion of the magazine into its take-up position.

And yet another object of the invention is to provide a take-up magazine which requires the minimum amount of manipulation and which can be readily handled by an unskilled operator.

Other objects and advantages will be apparent to those skilled in the art by the description which follows.

The objects of the invention are embodied in a magazine adapted to be inserted in a chamber, a winding member rotatable within the magazine for receiving a strip material, an adhesive means on the winding member for adhering to the leading end of the strip material, a guide means movable within the magazine, for directing the strip material to the winding member, and having a part thereof in engagement with the adhesive means for applying the leading end of the strip material thereto and movable away from the winding member by the strip material wound thereon, and a stop means on the magazine movable by the guide means from an inoperative position to a protruding position with respect to the magazine, after a predetermined amount of the strip material has been wound on the winding member, for preventing reinsertion of the magazine into said chamber and movable by the casing to a retracted position to permit withdrawal of the magazine from the chamber.

While the present invention is described as being embodied in a magazine for a camera, it is equally applicable to any photographic apparatus of the magazine type. Thus, the present invention is not to be limited by the illustrated embodiment thereof but has a scope as broad as the interpretation of the claims permit.

Reference is now made to the accompanying drawings wherein like reference numerals designate like parts and wherein:

Fig. 1 is a side elevation of a camera showing the preferred embodiment of a take-up magazine in position in the take-up chamber and in which the strip material is advanced horizontally into the magazine;

Fig. 2 is a front elevation with the cover removed of the preferred form of the magazine embodying the invention and showing the means for directing the strip material to the adhesive surface of the core;

Fig. 3 is a sectional view taken substantially on the line 3—3 of Fig. 2;

Fig. 4 is a left end elevation of the magazine showing the stop means and the external drive member for the take-up core;

Fig. 5 is a rear elevation of the preferred form of the magazine showing the external drive member for the take-up core and the various positions assumed by the stop means;

Fig. 6 is a side elevation of a camera showing the application of a second and third embodiment of the invention to a camera in which the strip material is advanced vertically into the magazine;

Fig. 7 is a vertical section through a take-up magazine for use in a camera of the type disclosed in Fig. 6 and showing the relation of the various parts as the leading edge of the strip material is secured to the take-up core;

Fig. 8 is a view similar to Fig. 7 showing the relation of the various parts when the take-up core has wound up a considerable length of the strip material;

Fig. 9 is a horizontal section through the magazine and showing in plan view the arrangement of the elements therein and in the position as shown in Fig. 7.

Fig. 10 is a vertical section through the guide means for directing the strip material to the take-up core, as shown in Figs. 7 and 8;

Fig. 11 is a vertical section through a take-up magazine and disclosing another embodiment of the invention; and Fig. 12 is a view similar to Fig. 7 showing the relation of the various elements after a considerable length of the strip material has been wound on the take-up core.

While the cameras disclosed in the accompanying drawings are purely schematic, a more detailed description of either type of camera may be had upon reference to co-pending U. S. application Serial No. 76,905, filed concurrently with the present application in the name of William Bornemann and pending U. S. application, Serial No. 791,614, filed December 13, 1947, now U. S. Patent Number 2,552,250, in the names of William Bornemann and Norman R. Newman.

With respect to Figs. 1–5, the magazine, designated broadly by the numeral 10, is inserted in a chamber in the camera body or casing 11. The camera 12 has contained therein supply reel 13, a pair of rollers 14 and 15, sprocket 16, pulley 17 on the sprocket shaft, pulley 18 on shaft 19, belt 20 connecting pulleys 17 and 18 and gear 21 within the magazine chamber and on shaft 19 which meshes with gear 22 on the outside of the magazine 10. The camera 12 is provided with a lens 23 and a winding handle 24 adapted to be folded over to engage the sprocket shaft for advancing the strip material manually. The strip material may also be advanced automatically as described in the above-mentioned Bornemann application. The strip material is advanced from reel 13 by sprocket 16 through a suitable guideway provided with an exposure aperture into the magazine 10.

The magazine 10 comprises a casing 30 having an enclosed receiving chamber 31 provided with a slot 32 for introducing the strip material into the chamber. The chamber is enclosed by cover 33, and a removable member 34 is threaded into cover 33 to provide access to said chamber for removing the strip material contained therein without removing cover 33.

The take-up core 35 or winding member is keyed to a spindle 36 journaled in the bearing member 37 fixed to the rear wall 38 of casing 30 and maintained in alignment by member 34. Spindle 36 extends externally of the wall 38 into recess 39 which is partially covered by plate 40. Gear 22 is secured to the external portion of spindle 36 and upon rotation of pulley 17, pulley 18 and gear 21 are rotated thereby rotating gear 22, spindle 36 and take-up core 35. The periphery of the take-up core 35 is provided with an adhesive surface 41 which does not harden but remains "tacky" for adhering the leading end of the strip material thereto. While in the illustrated embodiment of the invention the adhesive surface covers the entire peripheral surface of the core 35, it is to be understood that the adhesive may be applied to the peripheral surface in bands extending axially of the core, in bands circumferentially along the edge of the core whereby only the edges of the leading end of the strip material will be adhered to the core, or in spots distributed over the peripheral surface of the core.

The strip material is directed from the slot 32 to core 35 by the guide means 43 mounted on the pivotal spindle 44 and urged toward the core 35 by spring 45. The guide means 43 comprises a plate 46 on which a hollow rectangular member 47 is secured and which extends between slot 32 and core 35 to provide a substantially arcuate path for the strip material. A roller 48 is freely rotatable on the pin 49 carried on the end of plate 46 and engages the adhesive surface 41 on core 35.

As the strip material is advanced into magazine 10 by sprocket 16, the leading end thereof enters slot 32 and then member 47 which directs it to the core 35. As the leading end emerges from member 47, it is directed between the adhesive surface 41 and roller 48, the end of the strip material moving roller 48 away from the surface and spring 45 causing roller 48 to adhere the strip material to the adhesive surface. Roller 48, therefore, moves plate 46 and member 47 outwardly toward the casing as the strip material is wound onto core 35.

The spindle 44 extends through the wall 38 and into recess 51 and carries on its external end lever 52 which is movable with the guide means 43 and which carries a stud 53. A bell-crank lever 54 is pivotally mounted at 55 in recess 51 and has one arm 57 thereof held in engagement with stud 53 by spring 56. The other arm 58 of lever 54 also lies within recess 51 when core 35 does not have any strip material wound thereon, see full line position of levers in Fig. 5. As the strip material is wound onto core 35, the diameter increases and the guide means 43 is moved outwardly toward the casing, the lever 52 moving therewith. The clockwise rotation of lever 52, see Fig. 5, also rotates lever 54 in a clockwise direction until the end of arm 58 protrudes beyond the magazine and into a slot 59 in the camera body, see Fig. 1 and broken line position of Fig. 5, to provide a stop means to prevent reinsertion of that magazine into the camera before the strip material has been removed. Upon withdrawal of the magazine from the camera chamber, the protruding end of arm 58 strikes the slot 59 and lever 54 is rocked to a retracted position, see broken line position Fig. 5, to permit withdrawal of the magazine. It will be noted that lever 54 in its retracted position is moved against the action of spring 56 and away from stud 53. When the magazine has been completely withdrawn, the arm 58 is returned to its protruding position with respect to the magazine. If an attempt is made to again insert the withdrawn magazine before removing the strip material contained therein, the protruding arm 58 will prevent insertion because it will strike the camera body or casing and the guide means 43 bearing against the convolutions of strip material will not permit levers 52 and 54 to be rotated in a counter-clockwise direction, as viewed in Fig. 5. It is not necessary that core 35 be fully wound with strip material, and arm 58 fully extended into its protruding position for the stop means to be operable, since arm 58 may be moved to its retracted position as soon as it extends only partially beyond the magazine. In other words, the stop means is operable to prevent reinsertion of the magazine after a predetermined amount of strip material has been wound onto the take-up core 35, that is, an amount sufficient to move the arm 58 into a protruding position with respect to the magazine.

In Fig. 6, the strip material is automatically and intermittently advanced by sprocket 16 from the supply reel 13, between the rollers 14 and 15, past an exposure aperture in a suitable guideway, not shown, and into the take-up magazine. In this type of camera the strip material is fed vertically and the magazine is inserted at the bottom of the camera into the chamber 60. The pulley 17 on the sprocket shaft is connected by a belt 20 to a pulley 18 on the shaft 19 aligned with the take-up core 35. The magazine 61 has a cover 62 and may be provided with an external gear as in the preferred embodiment just described, a simple clutch means or a friction drive member as disclosed in U. S. Patent No. 2,095,849, issued October 12, 1937, to O. Wittel.

In this and the following embodiment, take-up core 35 is keyed to the spindle 63 which is journalled in bearing member 64 secured to side wall 65. The spindle extends to the exterior of the magazine and is provided with slot 66 for engaging the clutch member on shaft 19. As in the previously described embodiment, the take-up core 35 is provided with an adhesive coated peripheral surface 41. The guide means 67 comprises two channel shaped members 68 and 69, see Fig. 10, which are secured together to form a hollow rectangular chute for directing the strip material from slot 70 in the magazine, which is aligned with slot 71 in the camera, in a substantially arcuate path to the take-up core 35. The members 68 and 69 are mounted on pintle 72 and urged toward the take-up core 35 by spring 73. Roller 74 is freely rotatable between members 68 and 69 and, as previously described, serves to adhere the leading end of the strip material to the take-up core 35. The pintle 72 extends into the recess 75 and has fixed thereto a lever 76 which is movable with guide means 67 and which carries at its opposite end the stud 77. A second lever 78 is pivotally mounted in recess 75 at 79 and is provided with an elongated slot 80 for engaging stud 77 at one end and a stop portion 81 movable into slot 59 in the camera body at the other end.

As shown in Figs. 7 and 8, the lever 78 is moved in a counter-clockwise direction from a position within the contour of the magazine to a protruding position with respect to the magazine as the strip material increases the diameter of the take-up core 35. As the magazine is withdrawn from chamber 61 by finger grip 82 formed in the end wall, the slot 59 rocks lever 78 in a counter-clockwise direction to a retracted position to a permit withdrawal and through slot 80 and stud 77, the guide means 67 is moved away from the convolutions of strip material.

In Figs. 11 and 12, the magazine casing 85 may be die cast or molded and provided with a suitable cover, not shown. The take-up core 35 is rotatably mounted within casing 85 and provided with an adhesive surface 41 as previously described. A slot 86 guides the strip material to a guide means 87 which comprises a resilient member 88 secured to end wall 89 of the casing and extending obliquely toward the take-up core 35, and a second resilient member 90 secured to the opposite end wall 91 and extending across the casing into a niche 92 in wall 91. The central portion of the member 90 engages the adhesive surface 41 of the take-up core 35 for adhering the leading end of the strip material thereto. The stop means comprises a headed pin 93 which is normally held within casing 85 by spring 94 and which has an oblique end 95, pin 93 being movable by the end of member 90 against the action of spring 94 into aperture 96 in camera casing 11. The members 88 and 90 may be relieved or embossed centrally thereof so the strip material is engaged only along the edges.

As the strip material is wound on the take-up core 35, the member 88 is moved downwardly and the end of member 90 is moved from the niche 92 into contact with the head of pin 93 for moving end 95 thereof into aperture 96, as shown in Fig. 12. In the position shown in Fig. 12 members 88 and 90 still serve as a guide means for directing the strip material to the take-up core. Upon withdrawal of the magazine, the aperture 96 urges pin 93 upwardly against the action of member 90 until the magazine is clear of the chamber when the member 90 will again move pin 93 into its protruding position with respect to the magazine. In its protruding position, the pin 93 serves as a stop means to prevent reinsertion of the magazine into the chamber until the strip material has been removed from the magazine.

Since other modifications of the invention are possible, the scope of the invention is not to be limited to the illustrated embodiments but is defined by the appended claims.

Having now particularly described our invention, what we desire to secure by Letters Patent of the United States, and what we claim is:

1. In a magazine of the type for receiving a strip material, the combination with a casing having an aperture for said strip material, of a winding member rotatable within said casing for receiving said strip material, a guide means pivotally mounted within said casing adjacent said aperture, for directing said strip material to said winding member, and having a part thereof in engagement with said winding member, said guide means being movable away from said winding member by the strip material wound thereon, and a stop means operatively connected to and movable by said guide means into a protruding position with respect to said magazine after a predetermined amount of said strip material has been wound onto said winding member.

2. In a magazine of the type for receiving a strip material, the combination with a casing having an aperture for said strip material, of a winding member rotatable within said casing for receiving said strip material, means for securing the leading end of said strip material to said winding member, a guide means operatively and movably connected to said casing adjacent said aperture, for directing said strip material to said winding member, and having a part thereof in engagement with said winding member, said guide means being movable away from said winding member by the strip material wound thereon, and a stop means operatively connected to and movable by said guide means into a protruding position with respect to said magazine after a predetermined amount of said strip material has been wound onto said winding member.

3. In a magazine of the type for receiving a strip material, the combination with a casing having an aperture for said strip material, of a winding member rotatable within said casing for receiving said strip material, an adhesive means on said winding member for adhering to the leading end of said strip material, a guide member pivotally mounted within said casing adjacent said aperture, for directing said strip material to said winding member, and having a part thereof in engagement with said adhesive means for applying the leading end of said strip material thereto, said guide means being movable away from said winding member by the strip material wound thereon, and a stop means operatively connected to and movable by said guide means into a protruding position with respect to said magazine after a predetermined amount of said strip material has been wound onto said winding member.

4. In a photographic apparatus of the magazine type, the combination with a casing provided with a magazine receiving chamber, of a magazine having an aperture therein and adapted to be inserted in said chamber, a winding member rotatable within said magazine for receiving a strip material, a guide means operatively and movably connected to said magazine adjacent said aperture, for directing said strip material to said winding member, and having a part thereof in engagement with said winding member, said guide means being movable away from said winding member by the strip material wound thereon, and a stop means on said magazine operatively connected to and movable by said guide means into a protruding position with respect to said magazine to prevent re-insertion of said magazine into said chamber after a predetermined amount of said strip material has been wound onto said winding member.

5. In a photographic apparatus of the magazine type, the combination with a casing provided with a magazine receiving chamber, of a magazine having an aperture therein and adapted to be inserted in said chamber, a winding member rotatable within said magazine for receiving a strip material, means for securing the leading end of said strip material to said winding member, a guide means operatively and movably connected to said magazine adjacent said aperture, for directing said strip material to said winding member, and having a part thereof in engagement with said winding member, said guide means being movable away from said winding member by the strip material wound thereon, and a stop means on said magazine operatively connected to and movable by said guide means into a protruding position with respect to said magazine to prevent reinsertion of said magazine into said chamber after a predetermined amount of said strip material has been wound onto said winding member and movable by said casing independently of said guide means to permit withdrawal of said magazine from said chamber.

6. In a photographic apparatus of the magazine type, the combination with a casing provided with a magazine receiving chamber, of a magazine having an aperture therein and adapted to be inserted in said chamber, a winding member rotatable within said magazine for receiving a strip material, an adhesive means on said winding member for adhering to the leading end of said strip material, a guide means operatively and movably connected to said magazine adjacent said aperture, for directing said strip material to said winding member, and having a part thereof in engagement with said adhesive means for applying the leading end of said strip material thereto, said guide means being movable away from said winding member by the strip material wound thereon, and a stop means on said magazine operatively connected to and movable by said guide means from an inoperative position to a protruding position with respect to said magazine, after a predetermined amount of said strip material has been wound on said winding member, for preventing reinsertion of the magazine into said chamber and movable by said casing to a retracted position to permit withdrawal of said magazine from said chamber.

7. In a photographic apparatus of the magazine type, the combination with a casing provided with a magazine receiving chamber, of a magazine having an aperture therein and adapted to be inserted in said chamber, a winding member rotatable within said magazine for receiving a strip material, an adhesive means on said winding member for adhering to the leading end of said strip material, a guide means operatively and movably connected to said casing adjacent said aperture, for directing said strip material to said winding member, and having a part thereof in engagement with said adhesive means for applying the leading end of said strip material thereto, said guide means being movable away from said winding member by the strip material wound thereon, an actuating means operatively connected to said guide means and movable therewith, a stop means on said magazine and operatively connected to and movable by said actuating member from an inoperative position to a protruding position with respect to said magazine, after a predetermined amount of said strip material has been wound on said winding member, for preventing reinsertion of the magazine into said chamber and movable by said casing, independently of said actuating member, to a retracted position to permit withdrawal of the magazine from said chamber.

8. In photographic apparatus of the magazine type, the combination with a casing provided with a magazine receiving chamber, of a magazine having an aperture therein and adapted to be inserted in said chamber, a winding member rotatable within said magazine for receiving a strip material, an adhesive means on said winding member for adhering to the leading end of said strip material, a guide means operatively and movably connected to said casing adjacent said aperture, for directing said strip material to said winding member, and having a part thereof in engagement with said adhesive means for applying the leading end of said strip material thereto, said guide means being movable away from said winding member by the strip material wound thereon, an actuating lever operatively connected to said guide means and movable therewith, a lever pivotally mounted on said magazine and having one part thereof operatively connected to said actuating lever and another part thereof adapted to be moved by said actuating lever from an inoperative position to a protruding position with respect to said magazine, after a predetermined amount of said strip material has been wound on said winding member, for preventing reinsertion of the magazine into said chamber and movable by said casing to a retracted position to permit withdrawal of the magazine from said chamber.

9. In photographic apparatus of the magazine type, the combination with a casing provided with a magazine receiving chamber, of a magazine having an aperture therein and adapted to be inserted in said chamber, a winding member rotatable within said magazine for receiving a strip material, an adhesive means on the periphery of said winding member for adhering to the leading end of said strip material, a guide means pivotally mounted within said casing, adjacent said aperture, for directing said strip material to said winding member, and having a roller in engagement with said adhesive means for applying the leading end of said strip material thereto, said guide means being movable away from said winding member by the strip material wound thereon, an actuating lever operatively connected to said guide means externally of said magazine and movable with said guide means, a lever pivotally mounted on said magazine and having one part thereof operatively connected to said actuating lever and another part thereof adapted to be moved by said actuating lever from an inoperative position to a protruding position with respect to said magazine, after a predetermined amount of said strip material has been wound on said winding member, for preventing reinsertion of the magazine into said chamber and movable by said casing independently of said actuating lever to a retracted position to permit withdrawal of the magazine from said chamber.

10. In photographic apparatus of the magazine type, the combination with a casing provided with a magazine having an aperture therein and receiving chamber, of a magazine adapted to be inserted in said chamber, a winding member rotatable within said magazine for receiving a strip material, an adhesive means on the periphery of said winding member for adhering to the leading end of said strip material, a guide means including a guide member fixed to one wall of said magazine adjacent said aperture and extending toward said winding member and a second guide member fixed to a wall of said magazine substantially opposite said first-mentioned guide member, having a portion thereof in engagement with said adhesive means for applying the leading end of said strip material thereto, and the end thereof engaging the opposite wall of said magazine adjacent said aperture, said first-mentioned guide member and the end of said second guide member forming a chute for directing said strip material to said winding member and movable away from said winding member by the strip material wound thereon, and a stop means within said magazine and movable by the end of said second member from an inoperative position to a protruding position with respect to said magazine after a predetermined amount of said strip material has been wound on said winding member for preventing reinsertion of the magazine into said chamber and movable by said casing to a retracted position to permit withdrawal of the magazine from said chamber.

11. In photographic apparatus of the magazine type the combination with a casing provided with a magazine having an aperture therein and receiving chamber, of a magazine adapted to be inserted in said chamber, a winding member rotatable within said magazine for receiving a strip material, an adhesive means on the periphery of said winding member for adhering to the leading end of said strip material, a guide means including a resilient member fixed to one wall of said magazine adjacent said aperture and extending toward said winding member and a second resilient member fixed to a wall of said magazine substantially opposite said first-mentioned resilient member, having a portion thereof in engagement with said adhesive means for applying the leading end of said strip material thereto and the end thereof engaging the opposite wall of said magazine adjacent said aperture, said first-mentioned resilient member and the end of said second resilient member forming a chute for directing said strip material to said winding member and movable away from said winding member by the strip material wound thereon, and a stop member within said magazine and movable by the end of said second resilient member from an inoperative position to a protruding position with respect to said magazine, after a predetermined amount of said strip material has been wound on said winding member, for preventing reinsertion of the magazine into said chamber and movable by said casing independently of said second guide member to a retracted position to permit withdrawal of the magazine from said chamber.

WILLIAM BORNEMANN.
ROBERT A. GORDON.

REFERENCES CITED

The following references are of record in the file of this patent:

UNITED STATES PATENTS

| Number | Name | Date |
| --- | --- | --- |
| 2,089,330 | Becker | Aug. 10, 1937 |
| 2,220,917 | Schwartz | Nov. 12, 1940 |
| 2,462,683 | Schwartz et al. | Feb. 22, 1949 |
| 2,469,008 | Simmon et al. | May 3, 1949 |

FOREIGN PATENTS

| Number | Country | Date |
| --- | --- | --- |
| 424,358 | Germany | Jan. 26, 1926 |
| 563,304 | Great Britain | Aug. 9, 1944 |